April 1, 1952 K. F. TRIPP 2,590,906
REFLECTION INTERFERENCE FILTER
Filed Nov. 22, 1946 2 SHEETS—SHEET 1

INVENTOR
Kenneth F. Tripp
BY
Pennie, Edmonds, Morton and Barrows
ATTORNEYS

INVENTOR
Kenneth F. Tripp
BY
Pennie, Edmonds, Morton and Barrows
ATTORNEYS

Patented Apr. 1, 1952

2,590,906

UNITED STATES PATENT OFFICE 2,590,906

REFLECTION INTERFERENCE FILTER

Kenneth F. Tripp, Tuckahoe, N. Y., assignor to Farrand Optical Co., Inc., a corporation of New York Application November 22, 1946, Serial No. 711,561

7 Claims. (Cl. 88—110)

This invention relates to optical filters operating by reflection for selecting desired color components from white or heterochromatic light and wherein the filtering action is the result of light ray interference and absorption due to multiple reflections between closely spaced parallel surfaces possessing high though unequal values of reflectance, one of which surfaces is semitransparent and one of which is opaque.

I have discovered that reflection filters providing colors of a purity, brightness and uniformity hitherto unobtainable may be produced by the use of closely spaced parallel metallic surfaces adapted to produce multiple reflections between them, the separation of the surfaces being of the order of magnitude of a few wave lengths of the light to be removed by interference, instead of large in comparison to this wave length as is customary in devices operating on the principle of the Fabry-Perot interferometer.

It is well known that interference colors may be produced in a beam of heterochromatic light by the interposition in the beam of two or more partially reflecting surfaces, separated by a distance which bears the correct relation to the wave length of the light to be removed by destructive interference. Interference due to multiple reflections between these surfaces will result in the transmission of some colors and the reflection of others. If the incident light is white, both the transmitted and reflected portions will be colored to a greater or lesser degree. Such a group of partially reflecting surfaces may constitute a filter. Whatever the separation of the surfaces, the condition for such interference is that the recombination, on the side of the filter where the desired colors are to be obtained, of fractions of the incident light which have been reflected an unequal number of times at the surfaces, shall occur with a total phase difference between the recombining fractions amounting to an odd integral number of half wave lengths for the colors which are undesired. This phase difference is due primarily to two contributions. The first of these is that attributable to the difference in optical path length traversed by the recombining fractions. The second contribution is derived from the changes in phase which may occur upon the reflection of light or at transmission through any discontinuity in the medium of propagation. For interfaces between air and metals or between metals and dielectric materials this boundary phase change, as it may be called, is in general not equal to one-half wave length but is a function of the two media at the interface and of the wave length of the light in question. In the case of air-dielectric interfaces this boundary phase change normally amounts to approximately one-half wave length and is usually said to occur only in the case of light passing from a rarer to a denser medium.

Although interferences of very high order may be observed when the separation of the reflecting surfaces is equal to a large number of wave lengths, as high as four or five hundred thousand, provided the illumination of the system is monochromatic, in order to obtain the separate colors from a beam of heterochromatic light it is necessary to restrict the interferences to relatively low orders and hence to keep the separation of the reflecting surfaces down to a value approaching a few wave lengths or less.

Prior efforts to produce optical filters operating by interference means have for the most part followed the natural phenomena of the interference colors displayed by thin films, such as soap or oil films. Such films depend upon the reflections occurring at the interfaces between air and the transparent dielectric medium, which may be oil or water or any more permanent nonmetallic transparent material whose index of refraction differs sensibly from unity. The essential feature in these cases is the discontinuities provided by the transitions between media having different velocities of propagation for light. The shortcoming of techniques using such a transparent, nonabsorbing film is that the reflectance at the two air-dielectric interfaces bounding the film is relatively low because of the small difference in refractive index between air and the dielectric.

In consequence of the low value of reflectance at the two boundaries of the dielectric layer, most of the light incident on such a filter is transmitted for all wave lengths so that the colors observed by reflection are of low brightness. In addition, this low value of reflectance results in a high decrement for the successive internal reflections within the dielectric layer. Thus, only a small number of virtual sources is available for the production of interference so that the rate of change of intensity with change of wave length is low. The peaks on a plot of reflectance against wave length therefore do not have steep sides, and the colors observed are of low purity. Finally, with air-dielectric boundaries for the filter, only a narrow band of wave lengths will be removed. This is because the boundary phase change is substantially equal to one-half wave length for light of all wave lengths. As soon as the contribution to phase difference on recombination due to difference in optical path length departs materially from an odd number of half wave lengths, the condition for destructive interference is no longer fulfilled. Since the light reflected from the filter includes energy of all wave lengths except those from within such a narrow band, it will appear tinted but not deeply colored.

Efforts to improve the brilliance and visual appeal of colors produced by this method have included, for example, the provision of an opaque mirror of the normal type with high reflectance for all wave lengths behind the dielectric film. Such an expedient is disclosed in the patent to W. H. Colbert, No. 2,394,533 of February 12, 1946. The improvement attainable by such means is limited, however, as appears from the small difference between the curves of reflectance as a function of wave lengths for simple dielectric films and the curves for films backed by an opaque mirror appearing in the drawings of that patent. In addition, all of the curves there shown are relatively flat. The maximum variation in reflectance there shown in approximately 30%, and the maximum value of reflectance is below 50%, even with the opaque mirror.

A second line of endeavor has consisted in the provision of a number of successive dielectric layers, each functioning as an interference mechanism. See for example the U. S. Patent to G. L. Dimmick, No. 2,379,790 of July 7, 1945. By successively multiplying the number of dielectric layers, it is possible to increase the purity and the brightness of the reflected colors. This procedure, however, has the drawback of difficult manufacturing requirements, the thickness of the dielectric layers being critical.

I have found that the aforesaid difficulties are in large measure avoided by using separate surfaces of reflectance high compared to that of air-dielectric interfaces. I use, namely, two metal layers of unequal thickness and the air-metal or metal-dielectric interfaces which they provide when separated by a spacing distance occupied by a dielectric material used as a common support.

My invention will be better understood from the following description taken in conjunction with the accompanying drawings, in which Fig. 1 represents a greatly magnified cross-section of a reflection filter according to the present invention disposed upon a support having a smooth surface;

Figure 1:
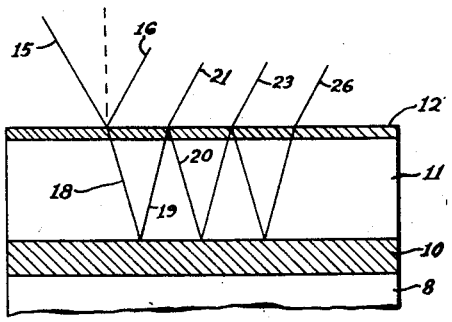

In Fig. 1, 8 represents a mechanical support with a smooth surface upon which is deposited by evaporation or otherwise a layer 10 of silver or aluminum, thick enough to have a transmission of 10% or less. On top of this metallic layer 10 is deposited a spacing layer 11 of a transparent dielectric material which may for certain embodiments of my invention be of magnesium fluoride, calcium fluoride, or similar material. This layer 11 may have a maximum thickness of some $10\lambda/n$, where $\lambda$ represents a wave length of light at which the filter reflects a maximum of light and $n$ represents the index of refraction of the transparent dielectric material. No lower limit need be set to the thickness of the layer 11, provided only that a layer 11 exists, having an index of refraction different from that of the two layers on either side of it. All that is necessary is to provide a spacing layer so that the boundary phase changes may occur as the light traverses or is reflected at the boundaries of the two metallic layers on either side of this layer 11. On top of the spacing layer 11 is deposited an extremely thin metallic layer 12 of silver or aluminum having a transmission between 25% and 65%. This layer will be further characterized by a reflectance of 50% to 10% and by an absorption of some 25%.

Since the invention is directed to filters whereby selected colors of high brightness and purity may be obtained by reflection, one of the reflecting surfaces is provided with an exceedingly high reflectance. This reflecting surface is furnished by the layer 10. In order, however, to prevent the loss of color separation initially achieved by destructive interference, that is to say by the out-of-phase relationship of the mediately and immediately reflected fractions of the unwanted components upon their arrival at the upper side of the filter, whereby they are propagated back into the filter again, care must be taken that the almost total reflection at the layer 10 does not send these unwanted components back into the space on the source side of the filter. Such an undesired addition of the wanted and unwanted components is prevented by successive reflections of the unwanted components between the reflecting surfaces of the layers 10 and 12 which face each other and by a partial absorption thereof which occurs with each such reflection. This absorption need not be due to a selective absorption characteristic of the metal used for the reflecting surfaces; in a preferred embodiment of my invention these layers are of silver or aluminum, which have substantially uniform absorption for all wave lengths of visible light. By providing, however, through critical spacing of the reflecting surfaces, that a process of destructive interference in combination with a relatively high value of reflectance at the surfaces shall produce multiple reflections of components of undesired wave lengths between the surfaces, I eliminate these components from the light reflected from the filter, a small fraction of the unwanted components being absorbed at each reflection until the intensity thereof is reduced to zero.

Consider a ray 15 of white light incident upon the filter of Fig. 1. A fraction of this incident ray, comprising some 25% thereof, will be specularly reflected from the metallic layer 12 as a ray 16. The remainder of the ray 15 will penetrate the layer 12, but a portion thereof, representing some 25% of the incident ray 15, will be lost by absorption in traversing this metallic layer. The remainder including some 50% of the incident ray 15 will emerge into the spacing layer 11 as a ray 18, each of the spectral components thereof having suffered its own particular sum of phase changes due to the discrete thickness of the metallic layer 12 and to passage through the interfaces at either side thereof. Upon impinging on the metallic layer 10 at the interface between the spacing layer 11 and the metallic layer 10, some 90% of ray 18 will be specularly reflected as a ray 19 with, however, a boundary phase change not in general equal to a half wave length, and varying in its departure from a half wave length among the various spectral components of the ray. This reflected radiation constituting the ray 19 will be propagated upward through the spacing layer 11 and will impinge upon the interface between the spacing layer 11 and the metallic layer 12. Of the ray 19 about one-quarter will be internally reflected back toward the layer 10 as a ray 20 to suffer further reflections, nearly complete at the layer 10 and partial at the layer 12. The major fraction of the energy of ray 19 will be propagated into the metallic layer 12 where about one-quarter thereof will be lost by absorption, leaving the remainder, approximately a quarter of the originally incident beam 15, to emerge into the air as a ray 21, having suffered on its travel upward from the interface between the metallic layer 10 and the spacing layer 11 propagation phase changes due to the thickness of the layers 11 and 12 and boundary phase changes due to the interfaces at the two sides of the metallic layer 12. As the ray 21 emerges into the air, it will combine with the ray 16, the various wave length components of the one ray uniting with the same wave length components of the other ray to produce reinforcement or cancellation according to the phase relations between these recombining fractions. For wave lengths for which the phase difference between the recombining fractions of the two rays is in the neighborhood of an odd number of half wave lengths, destructive interference occurs. This means that the energy of such wave lengths is propagated back into the filter, where the process is successively repeated until the radiation of such wave lengths is absorbed.

The recombination at the upper surface of the layer 12 is not only that of rays 16 and 21 but of additional rays, such as rays 23 and 26, which result from the partial emergence of fractions of the ray 15 which undergo further successive reflections between the layers 10 and 12. These additional factors in the recombination are present, as they would not be in a case involving a dielectric layer only, because the high values of reflectance at the interfaces of the layers 10 and 12 with the layer 11 maintains the radiation internally reflected between the layers 10 and 12 at a high enough intensity so that such rays 23 and 26 can contribute materially to the total radiation returned from the filter. The resulting interference pattern is therefore that due to a large number of virtual sources and the distribution of intensity in the fringe systems due to the various spectral components present is sharply peaked, the intensity in the maxima of a fringe system going up as the square of the number of interfering sources.

Assuming for example illumination of the filter by an extended source such as daylight, an observer with an eye in any given angular relation to the filter will receive light of a color for which the fringe system presents a maximum at that angle of observation. Because of the sharpness of the fringe systems, the colors seen by the observer will be pure, and because of the high reflectance of the layer 10 they will be bright. The high values of reflectance of the layers 10 and 12 therefore provide not only the indispensable means to color selection through absorption in the course of multiple reflections but also operate to give the reflected light color of high brightness and purity.

Since in my filters the reflection takes place at metallic surfaces, a substantial amount of absorption takes place in connection therewith, whereas almost no absorption takes place on reflection at dielectric surfaces. Although the theoretical treatment of the performance to be expected from an interference mechanism involving metallic layers is much more difficult than that for a mechanism involving dielectric layers because of the occurrence of absorption within the metallic layers and because the boundary phase changes occurring at the interfaces are in general complex functions of wave length and of the materials involved, the results are outstandingly successful in terms of the brightness and purity and hence of the visual appeal of the colors observed by reflection. The resulting colors by reflection are, therefore, of the type having the attributes of brilliance and purity much to be desired by the observer's subjective sense of color as explained, for example, in an article of D. MacAdams in the Journal of the Optical Society of America, volume 25 (1935), page 361.

Figure 2:
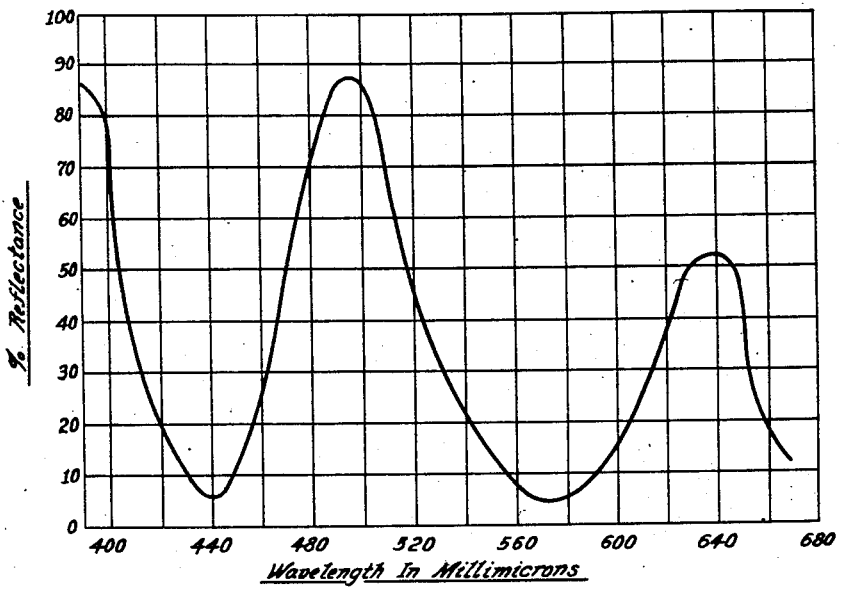
Fig. 2 is a typical curve of reflectance versus wave length for a filter of the type shown in Fig. 1.

Fig. 2 shows the spectral distribution of energy in the light reflected from a filter of the type shown in Fig. 1. The maximum of reflectance amounts to 86% and minimum reflectances of 5% and 6% appear on either side thereof. The spectral width of the reflectance peak is 54 millimicrons at one-half of the maximum.

Figure 3:
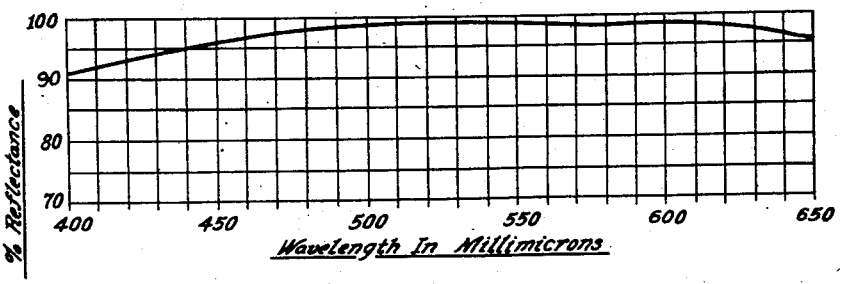
Fig. 3 represents the variation in reflectance with wave length for a structure comprising a single transparent layer deposited on an opaque metal backing, referred to the reflectance from such an opaque backing as 100%.

Fig. 3, showing the variation in reflectance with wave length produced by a transparent layer such as the layer 11 of Fig. 1 deposited upon an opaque metallic backing, referred to the reflectance from such an opaque backing alone as 100%, illustrates the important part played in my invention by the combined effect of the metallic layers 10 and 12 of Fig. 1. Whereas the curve of Fig. 2 is sharply peaked, as the result of multiple reflections and absorption, the simple soapfilm type dielectric layer deposited on a highly reflective opaque backing produces only a very slight filtering effect, as shown by the flat curve of Fig. 3.

Figure 4:
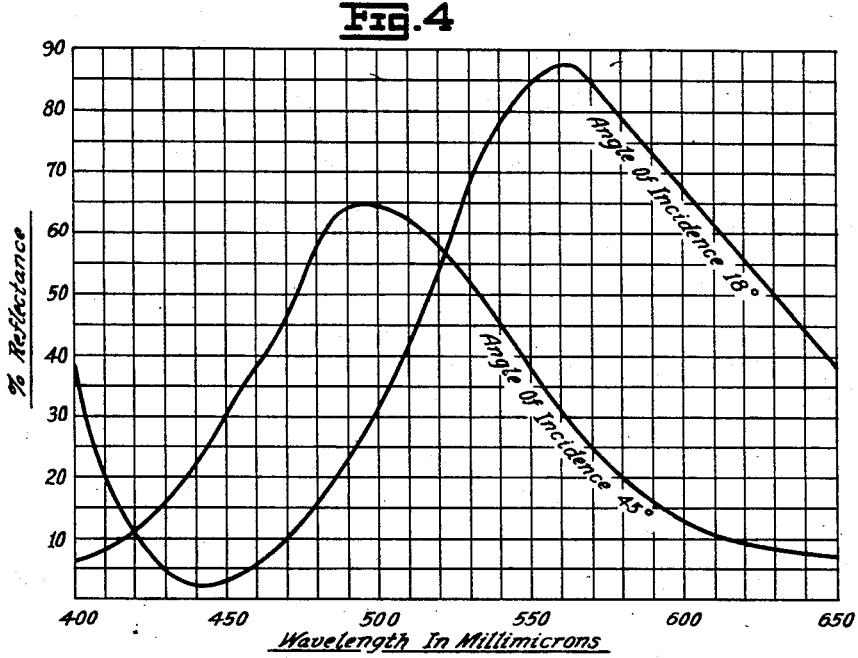
Fig. 4 represents the variation in reflectance with wave length for a filter of the type shown in Fig. 1 at two angles of incidence.
Figure 5:
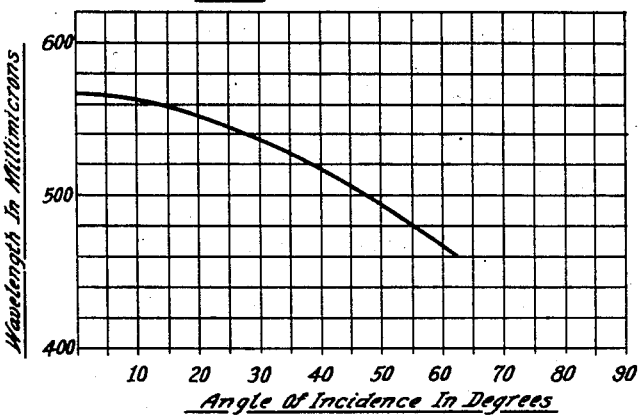
Fig. 5 represents the variation in wave length of maximum reflectance with angle of incidence for a filter of the type shown in Fig. 1.

An additional characteristic of reflection filters built in accordance with the present invention is a high rate of change of the colors observed by reflection with change of angle of incidence of the white light upon the coating. This means that a wide variety of colors may be obtained from a single filter by suitably varying the angle of incidence at which the unfiltered light strikes the filter. This dependence of wave length for maximum reflectance upon angle of incidence is illustrated in Fig. 4, which reproduces two reflectance versus wave length curves taken from the same filter at angles of incidence of 18 degrees and 45 degrees. The light reflected from the filter was predominantly green for white light incident at 45 degrees, and yellow for white light incident at 18 degrees. This dependence is further illustrated by Fig. 5, which shows a plot of wave length for maximum reflectance against angle of incidence, all the data therefor being taken from a single filter of the type shown in Fig. 1.

Figure 6:
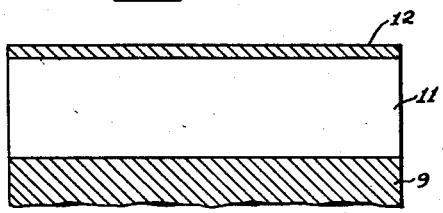
Fig. 6 shows a modification of my invention wherein one of the metallic layers is provided by a metallic mass of thickness adequate to provide mechanical support to the filter structure and having a smooth, mirror-like surface.

Fig. 6 shows a modification of my invention wherein for the highly reflective metallic layer use is made of a metallic mass 9 of silver or aluminum of thickness sufficient to support the filter structure. The separate deposition of the layer 10 of Fig. 1 is thus dispensed with. The mass 9, which may be of any shape, must be provided with a smooth surface, although not necessarily a plane surface, on which the dielectric layer 11 and the semi-transparent layer 12 may be deposited. The optical characteristics of such a filter will be substantially the same as those of a filter according to Fig. 1.

It is to be understood that it is not desired to limit the present invention to the precise details of construction nor to the use of the particular materials herein shown and described; various modifications are possible within the scope of the appended claims.

I claim:

1. An optical reflection filter operating by light ray interference and absorption comprising a substantially opaque layer of a metal selected from the group consisting of silver and aluminum, said opaque layer being deposited on a glass support, a substantially transparent layer of a dielectric selected from the group consisting of magnesium fluoride and calcium fluoride, said transparent layer being deposited on said opaque layer and having a thickness not exceeding $10\lambda/n$ in which $\lambda$ represents a wave length at which the filter reflects a maximum of light and $n$ represents the index of refraction of said transparent layer, and a semitransparent layer of a metal selected from the group consisting of silver and aluminum, said semitransparent layer being deposited on said transparent layer and having a transmission between substantially 25% and 65%.

2. An optical reflection filter operating by light ray interference and absorption comprising a semi-transparent layer of aluminum having a transmission between substantially 25% and 65% and a substantially opaque layer of aluminum deposited on a thin glass support, the said aluminum layers being maintained in substantially parallel spaced relation by a substantially transparent magnesium fluoride layer therebetween and of a thickness not exceeding $10\lambda/n$ in which $\lambda$ represents a wave length at which the filter reflects a maximum of light and $n$ represents the index of refraction of said transparent layer.

3. An optical reflection filter operating by light ray interference and absorption comprising a first surface mirror produced by depositing a substantially opaque aluminum layer on a glass support, a substantially transparent layer of magnesium fluoride deposited on said opaque layer and having a thickness between that of a monomolecular film as a minimum and $10\lambda/n$ as a maximum in which $\lambda$ represents a wave length of light at which the filter reflects a maximum of light and $n$ represents the index of refraction of said transparent layer, and a semi-transparent aluminum layer having transmission between substantially 25% and 65% on the front of said transparent layer, whereby said semi-transparent layer causes substantial elimination of light of some wave lengths from the light reflected from said mirror by virtue of the out-of-phase recombination of light of such wave lengths reflected from said mirror with light of such wave lengths reflected from said semi-transparent layer.

4. An optical reflection filter operating by light ray interference and absorption comprising a substantially opaque layer of silver deposited on a glass support, substantially transparent layer of magnesium fluoride deposited on said opaque layer and having a thickness not exceeding $10\lambda/n$ in which $\lambda$ represents a wave length at which the filter reflects a maximum of light and $n$ represents the index of refraction of said transparent layer, and a semitransparent layer of aluminum deposited on said transparent layer and having a transmission between substantially 25% and 65%.

5. An optical reflection filter operating by light ray interference and absorption comprising a substantially opaque layer of aluminum deposited on a glass support, a substantially transparent layer of magnesium fluoride deposited on said opaque layer and having a thickness not exceeding $10\lambda/n$ in which $\lambda$ represents a wave length at which the filter reflects a maximum of light and $n$ represents the index of refraction of said transparent layer, and a semitransparent layer of silver deposited on said transparent layer and having a transmission between substantially 25% and 65%.

6. An optical reflection filter operating by light ray interference and absorption comprising a substantially opaque layer of aluminum deposited on a glass support, a substantially transparent layer of calcium fluoride deposited on said opaque layer and having a thickness not exceeding $10\lambda/n$ in which $\lambda$ represents a wave length at which the filter reflects a maximum of light and $n$ represents the index of refraction of said transparent layer, and a semitransparent layer of aluminum deposited on said transparent layer and having a transmission between substantially 25% and 65%.

7. An optical reflection filter operating by light ray interference and absorption comprising a substantially opaque layer of silver deposited on a glass support, a substantially transparent layer of calcium fluoride deposited on said opaque layer and having a thickness not exceeding $10\lambda/n$ in which $\lambda$ represents a wave length at which the filter reflects a maximum of light and $n$ represents the index of refraction of said transparent layer, and a semitransparent layer of aluminum deposited on said transparent layer and having a transmission between substantially 25% and 65%.

KENNETH F. TRIPP.

REFERENCES CITED

The following references are of record in the file of this patent:

UNITED STATES PATENTS

| Number | Name | Date |
|---|---|---|
| 2,207,656 | Cartwright et al. | July 9, 1940 |
| 2,379,790 | Dimmick | July 3, 1945 |
| 2,391,127 | Carver | Dec. 18, 1945 |
| 2,394,533 | Colbert et al. | Feb. 12, 1946 |

FOREIGN PATENTS

| Number | Country | Date |
|---|---|---|
| 716,153 | Germany | Jan. 14, 1942 |